United States Patent Office 3,049,560
Patented Aug. 14, 1962

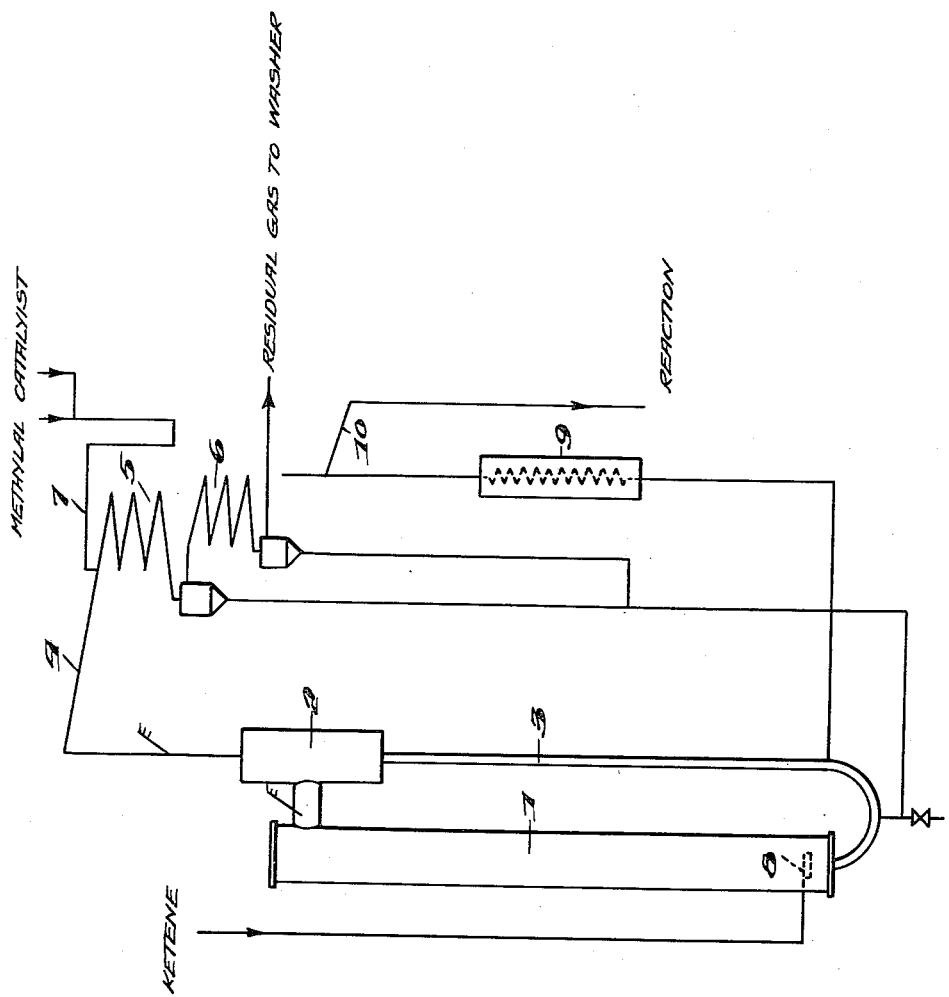

3,049,560
PROCESS FOR THE PRODUCTION OF BETA-ALKOXY SUBSTITUTED CARBOXYLIC ACID ESTERS
Eduard Enk, Fritz Knörr, and Hellmuth Spes, Burghausen, Upper Bavaria, Germany, assignors to Wacker-Chemie G.m.b.H., Munich, Germany
Filed Aug. 3, 1959, Ser. No. 831,342
Claims priority, application Germany Aug. 4, 1958
12 Claims. (Cl. 260—484)

The present invention relates to an improved process for the production of beta-alkoxy substituted carboxylic acid esters.

A process for the production of alkoxy substituted carboxylic acid esters has been described in U.S. Patent 2,436,286, in which ketene is introduced into an excess of acetal containing a dissolved acid catalyst. The following were indicated as suitable acid catalysts: sulfuric acid, phosphoric acid, benzene sulfonic acid, zinc chloride, ferric chloride, aluminum chloride, boron trifluoride and its addition products with ethers, esters and the like, the Friedel-Crafts type catalysts or combinations of these catalysts. When boron trifluoride was used as the catalyst, extraordinarily high quantities of catalyst were, for example, employed to obtain yields of 73% in the case of the production of beta-methoxy propionic acid methyl ester from methylal and ketene. Also, a large excess of the acetal was employed which had to be separated from the reaction product during the fractionation. This under circumstances can be rather difficult as the alkyl acetate produced as a by-product together with the alcohol used in the neutralization produce a mixture with the acetal which is difficult to separate.

The production of beta-alkoxy substituted carboxylic acid esters has also been described by Šorm and Smrt, Chemické Listy, 1953, page 414, in which small quantities of borontrifluoride in the form of its etherate were used. In this instance, however, the yield at a working temperature of 0° C. was only 29.3% of beta-methoxy propionic acid methyl ester based upon the ketene supplied when 0.05 mol of catalyst was employed per mol of ketene.

According to the invention it was unexpectedly found that beta-alkoxy carboxylic acid esters can advantageously be produced from ketenes and acetals when the latter are reacted in the presence of fluorides of elements of the 4th to 5th groups of the periodic system in their highest valent form or complex fluoric acids of elements of the 3rd or 5th groups of the periodic system in the highest valent form or mixtures of such complex fluoric acids with fluorides of elements of the 3rd group of the periodic systems in their highest valent form or combinations thereof in quantities of about 0.1–10%, based upon the total weight of the reactants and at temperatures between —50 and 150° C. Preferably, such fluoric compounds are employed which are soluble in the starting acetal.

In addition to ketene, $CH_2=C=O$, aldoketenes of the formula $RCH=C=O$ and ketoketenes of the formula $R_2C=C=O$ in which R signifies an alkyl group can also be employed as the starting materials.

Acetals of the following general formula are advantageously used

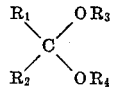

in which $R_1$ and $R_2$ are hydrogen or alkyl and $R_3$ and $R_4$ are alkyl.

The following are illustrative of catalysts which are particularly suited for the process according to the invention:

(1) Titanium tetrafluoride, antimony pentafluoride, arsenic pentafluoride, phosphorus pentafluoride.

(2) Hexafluorophosphoric acid ($HPF_6$) which can be employed per se or in the form of its starting materials or as a reaction product of $P_2O_5+12HF$, $HPO_3+6HF$, $H_3PO_4+6HF$, $H_2PO_3F+5HF$, $HPO_2F_2+4HF$,

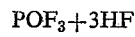

$POF_3+3HF$ and $PF_5+HF+H_2O$.

(3) Hexafluorophosphoric acid-di-etherate

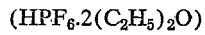

$(HPF_6 \cdot 2(C_2H_5)_2O)$ (4) Dihydroxy fluoroboric acid ($H_3BO_2F_2$).

(5) A mixed catalyst of monofluoro phosphoric acid ($H_2PO_3F$) with a maximum of 40% of $BF_3$.

(6) A mixed catalyst of difluoro phosphoric acid ($HPO_2F_2$) with a maximum of 25% of $BF_3$.

(7) A mixed catalyst of dihydroxy fluoroboric acid ($H_3BO_2F_2$) with a maximum of 25% of $BF_3$.

(8) Combinations of the above-mentioned catalysts.

When the process is carried out discontinuously, that is, batchwise, it is advantageously carried out at a temperature between —50 and +50° C. preferably between —10 and +25° C.

In contrast thereto, a reaction temperature between about 50 and 150° C., preferably 70 and 110° C., has been found advantageous when the process is carried out continuously. The use of such a higher temperature causes the maintenance of a high reaction speed for the formation of the alkoxy carboxylic acid ester so that the formation of by-products is reduced to a minimum despite the fact that a low acetal concentration of about 1–20% which is important for efficient execution of the process continuously is employed.

The reaction normally is carried out at atmospheric pressure or a superatmospheric pressure of up to about 5 atmospheres. However, if the ketene is produced under vacuum it is not absolutely necessary that it be compressed for the further processing. In this instance an absolute vacuum of about 40–760 mm. Hg can be employed.

The reaction product produced is neutralized preferably with an alcoholic alcoholate solution before it is distilled. In order to prevent transetherification or transesterification, it is preferable to employ an alcoholic component corresponding to that of the acetal employed. However, other alcohols can also be employed.

The process according to the invention can, for example, be carried out as follows:

A certain quantity of acetal containing the catalyst dissolved therein is provided in a glass frit column or a shaking autoclave which provides for fine distribution of the ketene introduced. The ketene is then introduced through an inlet into such reaction vessel. The quantity of ketene introduced is metered by a flow meter provided in the inlet. The reaction vessel is cooled with an ice-NaCl mixture in order to remove the heat of reaction so that a temperature characteristic to the acetal employed is assumed in the reaction vessel. After the introduction of the theoretical quantity of ketene or a slight excess up to about 5%, the reaction is terminated. Then the catalyst is neutralized with an alcoholic alcoholate of a metal of the 1st to 3rd groups of the periodic system, preferably while cooling, and the alkoxy carboxylic acid ester produced recovered by distillation under vacuum or at atmospheric pressure. By suitable variation of the conditions the process can be carried out continuously or as a cyclic process.

The accompanying drawing diagrammatically shows an apparatus suitable for carrying out the process according to the invention.

The following examples will serve to illustrate several embodiments of the process according to the invention.

Example 1

241.0 g. (=5.74 mol) of ketene were introduced into a solution of 10 g. of hexafluoro phosphoric acid in 416 g. (=5.47 mol) of formaldehyde dimethyl acetal at a velocity of 60 g. (=1.43 mol) ketene per hour. The reaction mixture was contained in a vessel surrounded by a bath maintained at −10–0° C. so that a reaction temperature of 6–8° C. was maintained in the reaction mixture. The resulting reaction product was neutralized to weak alkalinity with a solution of sodium methylate in methanol while cooling and then distilled. 561.6 g. (=4.75 mol) of beta-methoxypropionic acid methyl ester were produced corresponding to a yield of 83% based upon the ketene supplied and 91.1% based upon the formaldehyde dimethyl acetal converted. 20.0 g. (=0.26 mol) of unconverted formaldehyde dimethyl acetal were recovered.

Example 2

239.8 g. (5.71 mol) of ketene were introduced at a velocity of 60 g. (1.43 mol) ketene per hour into a solution of 20.0 g. of dihydroxy fluoroboric acid in 416 g. (=5.47 mol) of formaldehyde dimethyl acetal in a reaction vessel surrounded by a bath maintained at −10–0° C. so that the reaction mixture was maintained at 6–8° C. The reaction product was processed as in Example 1. 532.8 g. (=4.52 mol) of beta-methoxypropionic acid methyl ester were produced corresponding to a 79.1% yield based upon the ketene supplied and 92.9% based upon the formaldehyde dimethyl acetal converted. 46.1 g. (=0.61 mol) of unconverted formaldehyde dimethyl acetal were recovered.

Comparative tests carried out under the same conditions but with other acid catalysts gave the following results:

| Catalyst: | Percent yield based upon ketene supplied |
|---|---|
| Hf (98.5%) | 25.2 |
| FeCl$_3$ (water free) | 49.9 |
| Ni(BF$_4$)$_2$ | 21.2 |
| H$_3$PO$_4$ (85%) | 5.4 |
| PCl$_3$ | 3.5 |
| POCl$_3$ | 9.7 |
| PSCl$_3$ | 0 |
| PSBr$_3$ | 0 |
| AlCl$_3$ | 0 |
| AlBr$_3$ | 0 |
| Methane sulfonic acid | 0 |
| CF$_3$COOH | 0 |
| Zn(CF$_3$COO)$_2$ | 0 |
| TiCl$_4$ | 0 |
| MoF$_6$ | 0 |
| ClSO$_3$H | 19.8 |
| FSO$_3$H | 33.8 |
| BiCl$_3$ | 27.6 |
| AsF$_3$ | 29.6 |
| SbF$_3$ | 0 |

Example 3

214 g. (=5.10 mol) of ketene were introduced at a velocity of 60 g. (=1.43 mol) ketene per hour into a solution of 10 g. of titanium tetrafluoride in 416 g. (=5.47 mol) of formaldehyde dimethyl acetal in a reaction vessel surrounded by a bath maintained at −10–0° C. so that the reaction mixture was maintained at 6–8° C. The reaction product was processed as in Example 1. 540.0 g. (=4.57 mol) of beta-methoxy-propionic acid methyl ester were produced corresponding to a 89.6% yield based upon the ketene supplied and 85.5% based upon the formaldehyde dimethyl acetal converted. 8.9 g. (=0.12 mol) of unconverted formaldehyde dimethyl acetal were recovered.

Example 4

215 g. (=5.12 mol) of ketene were introduced at a velocity of 60 g. (=1.43 mol) ketene per hour into a solution of 40.0 g. of hexafluoro phosphoric acid etherate HPF$_6$.2(C$_2$H$_5$)$_2$O corresponding to 19.9 g. HPF$_6$ absolute in 416 g. (=5.47 mol) of formaldehyde dimethyl acetal in a reaction vessel surrounded by a bath maintained at −10–0° C. so that the reaction mixture was maintained at 6–8° C. The reaction product was processed as in Example 1. 467.6 g. (=3.96 mol) of beta-methoxy-propionic acid methyl ester were produced corresponding to a 77.4% yield based upon the ketene supplied and 72.5% based upon the formaldehyde dimethyl acetal converted. 3.1 g. (=0.04 mol) of unconverted formaldehyde dimethyl acetal were recovered.

Example 5

240.0 g. (=5.71 mol) of ketene were introduced at a velocity of 60 g. (=1.43 mol) ketene per hour into a solution of 20.0 g. antimony pentafluoride in 416 g. (=5.47 mol) of formaldehyde dimethyl acetal in a reaction vessel surrounded by a bath maintained at −10–0° C. so that the reaction mixture was maintained at 6–8° C. The reaction product was processed as in Example 1. 497.6 g. (=4.21 mol) of beta-methoxy propionic acid methyl ester were produced corresponding to a 73.7% yield based upon the ketene supplied and 77.6% based upon the formaldehyde dimethyl acetal converted. 3.1 g. (=0.04 mol) of unconverted formaldehyde dimethyl acetal were recovered.

Example 6

151.6 g. (=3.60 mol) of ketene were introduced at a velocity of 60 g. (=1.43 mol) ketene per hour into a solution of 10.0 g. of hexafluoro phosphoric acid in 560.9 g. (=3.50 mol) of formaldehyde di-n-butyl acetal in a reaction vessel surrounded by a bath maintained at −10–0° C. so that the reaction mixture was maintained at about 15–20° C. The resulting reaction product was neutralized to weak alkalinity with a solution of sodium-n-butylate in n-butanol while cooling and then distilled. 603.4 g. (=2.98 mol) of beta-n-butoxy propionic acid n-butyl ester of a boiling point of 114–115° C. at 10 mm. Hg were produced corresponding to a 82.6% yield based upon the ketene supplied and a 90.0% yield based upon the formaldehyde-di-n-butyl acetal converted. 33.5 g. (=0.21 mol) of unconverted formaldehyde-di-n-butyl acetal were recovered.

Example 7

147.1 g. (=3.51 mol) of ketene were introduced at a velocity of 60 g. (=1.43 mol) ketene per hour into a solution of 10.0 g. titanium tetrafluoride and 10.0 g. n-butyl acetate in 560.9 g. (=3.50 mol( of formaldehyde di-n-butyl acetal in a reaction vessel surrounded by a bath maintained at −10–0° C. so that the reaction mixture was maintained at about 15–20° C. The resulting reaction product was processed as in Example 6. 621.4 g. (=3.07 mol) of beta-n-butoxy propionic acid n-butyl ester of a boiling point of 114–115° C. at 10 mm. Hg were produced corresponding to a 87.6% yield upon the ketene supplied or 89.5% based upon the ketene absorbed and a 91.9% yield based upon the formaldehyde-di-n-butyl acetal converted. 25.8 g. (=0.16 mol) of unconverted formaldehyde-di-n-butyl acetal were recovered.

Example 8

151 g. (=3.6 mol) of ketene were introduced at a velocity of 60 g. (=1.43 mol) per hour into a solution of 10 g. of hexafluoro phosphoric acid ester in 612 g. (=3.5 mol) isobutyraldehyde diallyl acetal in a reaction vessel surrounded by a bath maintained at −10–0° C. The resulting reaction product was neutralized with solid sodium acetate and then distilled. 508 g. (=2.4 mol) of beta-allyloxy-beta-isopropyl-propionic acid allyl ester of a boiling point of 77–82° C. at 1 mm. Hg were produced corresponding to a 66.6% yield based upon the ketene supplied and a 73.0% yield based upon the acetal converted. 35.7 g. (=0.21 mol) of the unconverted acetal were recovered.

*Example 9*

150.1 g. (=3.57 mol) of ketene were introduced at a velocity of 60 g. (=1.43 mol) ketene per hour into a solution of 6.0 g. monofluoro phosphoric acid in 560.9 g. (=3.50 mol) of formaldehyde di-n-butyl acetal in a reaction vessel surrounded by a bath maintained at −10–0° C. so that the reaction mixture was maintained at about 10° C. The resulting reaction product was processed as in Example 6. 190.1 g. (=0.94 mol) of beta-n-butoxy propionic acid n-butyl ester of a boiling point of 114–115° C. at 10 mm. Hg were produced corresponding to a 26.3% yield based upon the ketene supplied or 42.8% based upon the ketene absorbed and a 94.0% yield based upon the formaldehyde-di-n-butyl acetal converted. 401 g. (=2.57 mol) of unconverted formaldehyde-di-n-butyl acetal were recovered.

*Example 10*

148.6 g. (=3.54 mol) of ketene were introduced at a velocity of 60 g. (=1.43 mol) ketene per hour into a solution of 6.0 g. of a catalyst composed of 60% by weight of monofluoro phosphoric acid and 40% by weight of boron trifluoride in 560.9 g. (=3.50 mol) of formaldehyde di-n-butyl acetal in a reaction vessel surrounded by a bath maintained at −10–0° C. so that the reaction mixture was maintained at about 20–26° C. The resulting reaction product was processed as in Example 6. 545 g. (=2.71 mol) of beta-n-butoxy propionic acid n-butyl ester of a boiling point of 114.115° C. at 10 mm. Hg were produced corresponding to a 76.5% yield based upon the ketene supplied and a 84.5% yield based upon the formaldehyde-di-n-butyl acetal converted. 46.4 g. (=0.29 mol) of unconverted formaldehyde-di-n-butyl acetal were recovered.

*Example 11*

151 g. (=3.60 mol) of ketene were introduced at a velocity of 60 g. (=1.43 mol) ketene per hour into a solution of a 10 g. difluoro phosphoric acid in 560.9 g. (=3.50 mol) of formaldehyde di-n-butyl acetal in a reaction vessel surrounded by a bath maintained at −10–0° C. so that the reaction mixture was maintained at about 12° C. The resulting reaction product was processed as in Example 6. 485.4 g. (=2.40 mol) of beta-n-butoxy propionic acid n-butyl ester of a boiling point of 114–115° C. at 10 mm. Hg were produced corresponding to a 66.6% yield based upon the ketene supplied or 87.0% based upon the ketene absorbed and a 85.7% yield based upon the formaldehyde-di-n-butyl acetal converted. 112.3 g. (=0.70 mol) of unconverted formaldehyde-di-n-butyl acetal were recovered.

*Example 12*

151.1 g. (=3.60 mol) of ketene were introduced at a velocity of 60 g. (=1.43 mol) ketene per hour into a solution of 10 g. of a catalyst composed of 86% by weight of difluoro phosphoric acid and 14% by weight of boron trifluoride in 560.9 g. (=3.50 mol) of formaldehyde di-n-butyl acetal in a reaction vessel surrounded by a bath maintained at −10–0° C. so that the reaction mixture was maintained at about 25–34° C. The resulting reaction product was processed as in Example 6. 566.9 g. (=2.81 mol) of beta-n-butoxy propionic acid n-butyl ester of a boiling point of 114–115° C. at 10 mm. Hg were produced corresponding to a 78.2% yield based upon the ketene supplied and a 87.4% yield based upon the formaldehyde-di-n-butyl acetal converted. 44.4 g. (=0.28 mol) of unconverted formaldehyde-di-n-butyl acetal were recovered.

*Example 13*

126.0 g. (=3.0 mol) of ketene were introduced at a velocity of 60 g. (=1.43 mol) of ketene per hour into a solution of 30 g. of a catalyst consisting of 10.0 g. titanium tetrafluoride and 20 g. n-hexyl acetate in 648.0 g. (=3.0 mol) of formaldehyde-di-n-hexyl acetate in a reaction vessel surrounded by a bath maintained at −10–0° C. so that the reaction mixture was maintained at about 20–25° C. The resulting reaction product was neutralized to weak alkalinity with a solution of sodium-n-hexylate in n-hexanol while cooling and then distilled. 630.4 g. (=2.44 mol) of beta-n-hexoxy propionic acid-n-hexyl ester of a boiling point of 121–123° C. at 0.6 mm. Hg were obtained corresponding to an 81.2% yield based upon the ketene supplied and a 92.0% yield based upon the formaldehyde-di-n-hexyl acetal converted. 74.2 g. (=0.34 mol) of unconverted formaldehyde-di-n-hexyl acetal were recovered.

*Example 14*

126.6 g. (=3.02 mol) of ketene were introduced at a velocity of 60 g. (=1.43 mol) ketene per hour into a solution of 10 g. of hexafluoro phosphoric acid in 648.0 g. (=3.0 mol) of formaldehyde-di-n-hexyl acetal in a reaction vessel surrounded by a bath maintained at−10–0° C. so that the reaction mixture was maintained at about 20–250°. The resulting reaction product was processed as in Example 13. 656.5 g. (=2.55 mol) of beta-n-hexoxy propionic acid-n-hexyl ester of a boiling point of 121–123° C. at 0.6 mm. Hg were obtained corresponding to an 84.6% yield based upon the ketene supplied and an 88% yield based upon the formaldehyde-di-n-hexyl acetal converted. 22 g. (=0.1 mol) of unconverted formaldehyde-di-n-hexyl acetal were recovered.

*Example 15*

130.5 g. (=3.11 mol) of ketene were introduced at a velocity of 60 g. (=1.43 mol) ketene per hour into a solution of 30 g. of a catalyst consisting of 10 g. titanium tetrafluoride and 20 g. of beta-(2-ethyl)-butyl acetate in 648 g. (=3.0 mol) of formaldehyde-di-(2-ethyl)-butyl acetal in a reaction vessel surrounded by a bath maintained at −10–0° C. so that the reaction mixture was maintained at about 30° C. The resulting reaction product was neutralized to weak alkalinity with a solution of sodium-(2-ethyl)-butylate in (2-ethyl)-butanol and then distilled. 485.8 g. (=1.88 mol) of beta-(2-ethyl)-butoxy propionic acid-(2-ethyl)-butyl ester of a boiling point of 150–152° C. at 10 mm. Hg were obtained corresponding to a 60.5% yield based upon the ketene supplied or 62.7% based upon the ketene absorbed and an 83.6% yield based upon the formaldehyde-di-(2-ethyl)-butyl acetal converted. 161.6 g. (=0.75 mol) of unconverted formaldehyde-di-(2-ethyl)-butyl acetal were recovered.

*Example 16*

128 g. (=3.04 mol) of ketene were introduced at a velocity of 60 g. (=1.43 mol) ketene per hour into a solution of 10 g. of hexafluoro phosphoric acid in 648 g. (=3.0 mol) of formaldehyde-di-(2-ethyl)-butyl acetal in a reaction vessel surrounded by a bath maintained at −10–0° C. so that the reaction mixture was maintained at about 30–35° C. The resulting reaction product was neutralized to weak alkalinity with a solution of sodium-(2-ethyl)-butylate in (2-ethyl)-butanol and then distilled. 648 g. (=2.51 mol) of beta-(2-ethyl)-butoxy propionic acid-(2-ethyl)-butyl ester of a boiling point of 150–152° C. at 10 mm. Hg were obtained corresponding to an 82.4% yield based upon the ketene supplied and an 89.7% yield based upon the formaldehyde-di-(2-ethyl)-butyl acetal converted. 42.8 g. (=0.2 mol) of unconverted formaldehyde-di-(2-ethyl)-butyl acetal were recovered.

*Example 17*

107.1 g. (=2.55 mol) of ketene were introduced at a velocity of 60 g. (=1.43 mol) ketene per hour into a solution of 30 g. of a catalyst consisting of 10 g. of titanium tetrafluoride and 20 g. of n-octyl acetate in 681.3 g. (=2.5 mol) of formaldehyde-di-n-octyl acetal in a reaction vessel surrounded by a bath maintained at −10–0° C. so that the reaction mixture was maintained at about 20–28° C. The resulting reaction product was neutralized to weak alkalinity with a solution of sodium-n-octylate in n-octanol and then distilled. 685 g. (=2.18 mol) of beta-n-octoxy propionic acid-n-octyl ester of a boiling point of 159–161° C. at 0.2 mm. Hg were obtained corresponding to an 85.4% yield based upon the ketene supplied or 87.1% based upon the ketene absorbed and a 93.1% yield based upon the formaldehyde-di-n-octyl acetal converted. 42.8 g. (=0.16 mol) of unconverted formaldehyde-di-n-octyl acetal were recovered.

*Example 18*

111.6 g. (=2.62 mol) of ketene were introduced at a velocity of 60 g. (=1.43 mol) ketene per hour into a solution of 10 g. of hexafluoro phosphoric acid in 681.3 g. (=2.5 mol) of formaldehyde-di-n-octyl acetal in a reaction vessel surrounded by a bath maintained at −10–0° C. so that the reaction mixture was maintained at about 10–12° C. The resulting reaction product was processed as in Example 17. 719.4 g. (=2.29 mol) of beta-n-octoxy propionic acid-n-octyl ester of a boiling point of 159–161° C. at 0.2 mm. Hg were obtained corresponding to an 86.1% yield based upon the ketene supplied and a 93.5% yield based upon the formaldehyde-di-n-octyl acetal converted. 14.1 g. (=0.05 mol) of unconverted formaldehyde-di-n-octyl acetal were recovered.

*Example 19*

122.1 g. (=2.92 mol) of ketene were introduced at a velocity of 60 g. (=1.43 mol) ketene per hour into a solution of 30 g. of a catalyst consisting of 10 g. of titanium tetrafluoride and 20 g. of (2-ethyl)-hexyl acetate in 817.5 g. (=3 mol) of formaldehyde-di-(2-ethyl)-hexyl acetal in a reaction vessel surrounded by a bath maintained at −10–0° C. so that the mixture was maintained at about +10° C. The resulting reaction product was neutralized to weak alkalinity with a solution of sodium (2-ethyl)-hexylate in (2-ethyl)-hexanol while cooling and then distilled. 333.7 g. (=1.06 mol) of beta-(2-ethyl)-hexoxy propionic acid-(2-ethyl)-hexyl ester of a boiling point of 189–191° C. at 10 mm. Hg were obtained corresponding to a 36.6% yield based upon the ketene supplied or 54.6% based upon the ketene absorbed and a 72.1% yield based upon the formaldehyde-di-2-ethyl)-hexyl acetal converted. 417.5 g. (=1.53 mol) of the unconverted acetal were recovered.

*Example 20*

125.5 g. (=2.98 mol) of ketene were introduced at a velocity of 60 g. (=1.43 mol) ketene per hour into a solution of 10 g. of hexafluoro phosphoric acid in 817.5 g. (=3 mol) of formaldehyde-di-(2-ethyl)-hexyl acetal in a reaction vessel surrounded by a bath maintained at −10–0° C. so that the mixture was maintained at about 25–30° C. The resulting reaction product was processed as in Example 19. 776.2 g. (=2.48 mol) of beta (2-ethyl)-hexoxy propionic acid-(2-ethyl)-hexyl ester of a boiling point of 189–191° C. at 10 mm. Hg were obtained corresponding to an 83% yield based upon the ketene supplied and an 88.9% yield based upon the formaldehyde-di-(2-ethyl)-hexyl acetal converted. 57.7 g. (=0.21 mol) of the unconverted acetal were recovered.

*Example 21*

147.1 g. (=3.50 mol) of ketene were introduced at a velocity of 60 g. (=1.43 mol) per hour into a solution of 10 g. of hexafluoro phosphoric acid in 560.9 g. (=3.50 mol) of formaldehyde-di-n-butyl acetal in a brine cooled shaking autoclave the interior pressure of which had been raised to 3 atmospheres by the introduction of nitrogen. The reaction product was neutralized to weak alkalinity with a solution of sodium-n-butylate in n-butanol while cooling and then distilled. 600.0 g. (=2.98 mol) of beta-n-butoxy propionic acid-n-butyl ester of a boiling point of 114–115° C. at 10 mm. Hg were obtained corresponding to an 85% yield based upon the ketene supplied and a 90.6% yield based upon the formaldehyde-di-n-butyl acetal converted. 35 g. (=0.22 mol) of the unconverted acetal were recovered.

*Example 22*

4,710 g. (=84.2 mol) of methyl ketene were introduced at an absolute vacuum of 120 mm. Hg at a velocity of 734.5 g. (=13.1 mol) per hour into a Raschig ring containing trickle tower, in which 3500 g. of methyl propionate containing 1.92% of hexafluoro phosphoric acid was recycled. The temperature of the recycled liquid was maintained at 0° C. A 10% excess of absolute methylal was continuously supplied together with the methyl ketene and also sufficient hexafluorophosphoric acid was supplied that a HPF$_6$ concentration of 1.92% was maintained in the recycled liquid. After neutralization of the reaction liquid with sodium methylate in methanol and then distilling 8100 g. (=61.4 mol) of beta-methoxy-isobutyric acid methyl ester of a boiling point of 147° C. at 730 mm. Hg or 58–61° C. at 29 mm. Hg were obtained corresponding to a 73% yield upon the methyl ketene supplied.

*Example 23*

14,600 g. (=208 mol) of ethyl ketene were introduced at an absolute vacuum of 120 mm. Hg at a velocity of 900 g. (=12.85 mol) per hour into a Raschig ring containing trickle tower, in which 3500 g. of methyl propionate containing 1.7% of hexafluoro phosphoric acid was recycled. The temperature of the recycled liquid was maintained at 5–6° C. A 9.6% excess of absolute methylal was continuously supplied together with the ethyl ketene and also sufficient hexafluoro phosphoric acid was supplied that a HPF$_6$ concentration of 1.7% was maintained in the recycled liquid. After neutralization of the reaction liquid with barium methylate in methanol and then distilling 13,570 g. (=92.9 mol) of alpha-ethyl-beta-methoxy-propionic acid methyl ester of a boiling point of 63.5° C. at 14 mm. Hg were obtained corresponding to a 44.4% yield based upon the ethyl ketene supplied. The alpha-ethyl-beta-methoxy propionic acid obtained upon saponification of such ester distills at 122° C. at a pressure of 13 mm. Hg.

*Example 24*

7,600 g. (=90.5 mol) of isopropyl ketene were introduced at an absolute vacuum of 120 mm. Hg at a velocity of 1,170 g. (=13.93 mol) per hour into a Raschig ring containing trickle tower, in which 3500 g. of methyl propionate containing 2.52% of hexafluoro phosphoric acid was recycled. The temperatures of the recycled liquid was maintained at +2° C. A 13.6% excess of absolute methylal was continuously supplied together with the isopropyl ketene and also sufficient hexafluoro phosphoric acid was supplied at a HPF$_6$ concentration of 2.52% was maintained in the recycled liquid. After neutralization of the reaction liquid with calcium methylate in methanol and then distilling 3200 g. (=20.0 mol) of alpha-isopropyl-beta-methoxy-propionic acid methyl ester of a boiling point of 69–70° C. at 11 mm. Hg were obtained corresponding to a 22.1% yield based upon the isopropyl ketene supplied. The alpha-isopropyl-beta-methoxy-propionic acid obtained upon saponification of such ester distilled at 128° C., at a pressure of 12 mm. Hg.

*Example 25*

A flask provided with a reflux condenser, a storage vessel for supply of methylal thereto, a gas inlet tube and an overflow outlet was initially filled with 443.3 g. of a mixture of 400 g. (=3.38 mol) beta-methoxy propionic acid methyl ester, 40 g. of 95% methylal (38 g. of 100% methylal=0.49 mol and 2 g.=0.063 mol of methanol) and 3.3 g. of a catalyst produced by introducing 14 parts by weight boron trifluoride in 86 parts by weight of difluoro phosphoric acid. Then 120.4 g. (=2.86 mol) of ketene, 209.0 g. of 95% methylal (198.6 g. of 100% methylal =2.61 mol and 10.45 g.=0.327 mol of methanol) and 2.71 g. of the catalyst mixture were supplied thereto per hour.

A reaction temperature of 82–85° C. was maintained in the flask. The liquid content of the reaction flask up to the overflow during the ketene introduction amounted to 590 cc. The reaction product which continually left the flask over the overflow was collected in a neutralization vessel in which it was maintained at a pH of 7–8 by addition of sodium methylate in methanol. 99.2% of the ketene supplied was absorbed. The period the reactants remained in the flask expressed as the quotient $$\frac{\text{Cc. flask content}}{\text{Cc. yield per hour}}$$

was 105 minutes.

After 8 hours' operation 3048.5 g. reaction product were produced which was 98.3% of the material introduced. 82.1 g. of a 20% solution of sodium methylate in methanol were required to neutralize the reaction product which contained 0.39% of the catalyst mixture with reference to the sum of the reactants.

Upon distillation of the neutralized reaction product the following were recovered:

197.1 g. (=2.59 mol) of methylal (100%)=12.1% of the methylal introduced
63.2 g. methanol (from the neutralization)
251.5 g. (=3.4 mol) of methyl acetate, that is, 14.85% of the ketene introduced
2499.4 g. of beta methoxy propionic acid methyl ester of which
2099.4 g. (17.8 mol) were formed by the reaction.

This corresponds to a yield of 77.6% based upon the ketene supplied and 85.2% based upon 100% methylal.

*Example 26*

A recycling evaporator as shown in the drawing consisting of the reaction tube 1, the separator 2 and a return line 3 was initially filled with a mixture of 23,900 g. (=202 mol) of beta methoxy propionic acid methyl ester, 2600 g. of 95% methylal (2470 g. of 100% methylal=32.5 mol and 130 g. of methanol=4.1 mol) and 153 g. of the mixed catalyst as used in Example 25. Then 5,310 g. (126.4 mol) of ketene, 9,580 g. of 95% methylal (9,101 g. of 100% methylal=119.8 mol and 479 g. of methanol=15.0 mol) and 58 g. of the mixed catalyst, corresponding to about 0.4% based upon the sum of the reactants, were supplied thereto per hour.

The ketene supply was effected through a ketene distributor 8 located in the bottom of reaction tube 1. The methylal and catalyst were supplied to the reaction over conduit 7, via cooler 5, and return line 3. The reaction temperature rose to 83° C. within 20 minutes and held at 86–89° C. during the course of the seven hour run.

The vapors leaving separator 2 over tube 4 were condensed in water cooler 5 and brine cooler 6 and reached the return line 3 together with the methylal and catalyst supplied. The residual gas was passed to an after-scrubber supplied with acetic acid. The reaction product continuously ran out over cooler 9 and overflow 10 and was neutralized with 278 g. of 20% sodium methylate solution per hour at the rate it was formed. The entire content of the recycling evaporator up to the overflow was 35.8 liters. The period the reactants remained therein was 143 minutes. After a 7 hours' run 132 kg. of neutralized reaction product which corresponded to 98.1% of the material introduced were produced. The residual gas leaving the apparatus was free of ketene.

Upon distillation of the neutralized reaction product the following were recovered:

| | |
|---|---|
| Methylal | 14.3% based upon methylal (100%) introduced. |
| Methyl acetate | 14.3% based upon ketene introduced or respectively 121% of the methanol present in the methylal. |
| Beta methoxy propionic acid methyl ester. | 78.3% based upon ketene introduced and 82.7% based upon methylal (100%). |

*Example 27*

240 g. (=5.72 mol) of ketene were introduced at a velocity of 60 g. (=1.43 mol) per hour into a solution of 20 g. of arsenic pentafluoride in 416 g. (=5.47 mol) of formaldehyde dimethyl acetal in a reaction vessel surrounded by a bath maintained at −10–0° C. so that the reaction mixture was maintained at 4–6° C. The resulting reaction product was neutralized to weak alkalinity with sodium methylate in methanol while cooling and then distilled. 458 g. (=3.89 mol) of beta methoxy propionic acid methyl ester were obtained corresponding to a 68.0% yield based upon the ketene supplied and a 72% yield based upon the formaldehyde dimethyl acetal converted. 5 g. (=0.06 mol) of the unconverted acetal were recovered.

*Example 28*

217.5 g. (=5.17 mol) of ketene were introduced at a velocity of 60 g. (=1.43 mol) per hour into a solution of 20 g. of a catalyst in 416 g. (=5.47 mol) of formaldehyde dimethyl acetal in a reaction vessel surrounded by a bath maintained at −10–0° C.

The catalyst employed was produced according to the equation:

$$9H_2F_2 + 4B_2O_3 \rightarrow 6H_3BO_2F_2 + 2BF_3$$

by reacting 696 g. (=10.0 mol) of boric acid anhydride with 900 g. (=45 mol) of anhydrous hydrogen fluoride using about 1000 g. of petroleum ether (30–60° C.) as the reaction medium.

During the reaction the reaction mixture assumed a temperature of 4–6° C.

The resulting reaction product was processed as in Example 27. 443 g. (=3.75 mol) of beta methoxy propionic acid methyl ester were obtained, corresponding to a yield of 72.6% based upon the ketene introduced and 80% based upon the formaldehyde dimethyl acetal converted. 59.0 g. (=0.775 mol) of the unconverted acetal were recovered.

We claim:

1. A process for the production of beta alkoxy carboxylic acid esters from a ketene of the formula $$RCH=C=O$$

in which R is selected from the group consisting of hydrogen and alkyl groups and an acyclic aliphatic acetal of the formula

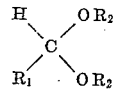

in which $R_1$ is selected from the group consisting of hydrogen and alkyl radicals and $R_2$ is an alkyl radical at a temperature between −50 and +150° C. in the presence of 0.1 to 10% based upon the total weight of the reactants of at least one catalyst selected from the group consisting of arsenic pentafluoride, titanium tetrafluoride, antimony pentafluoride, complex fluoric acids of boron and phosphorus and mixtures of complex fluoric acids of boron and phosphorus with boron trifluoride.

2. The process of claim 1 in which $H_2C=C=O$ is employed as the ketene reactant.

3. The process of claim 1 in which an aldoketene of the formula $RCH=C=O$ in which R is an alkyl group is employed as the ketene reactant.

4. A process for the production of beta alkoxy carboxylic acid esters from a ketene of the formula $$RCH=C=O$$

in which R is selected from the group consisting of hydrogen and alkyl groups and an aliphatic acetal of the formula

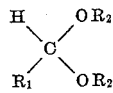

in which $R_1$ is selected from the group consisting of hydrogen an alkyl radicals and $R_2$ is an alkyl radical at a temperature between —50 and +150° C. in the presence of 0.1 to 10% based upon the total weight of the reactants of hexa fluorophosphoric acid.

5. A process for the production of beta alkoxy carboxylic acid esters from a ketene of the formula $$RCH=C=O$$

in which R is selected from the group consisting of hydrogen and alkyl groups and an aliphatic acetal of the formula

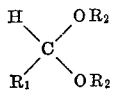

in which $R_1$ is selected from the group consisting of hydrogen and alkyl radicals and $R_2$ is an alkyl radical at a temperature between —50 and +150° C. in the presence of 0.1 to 10% based upon the total weight of the reactants of dihydroxy fluoroboric acid.

6. A process for the production of beta alkoxy carboxylic acid esters from a ketene of the formula $$RCH=C=O$$

in which R is selected from the group consisting of hydrogen and alkyl groups and an aliphatic acetal of the formula

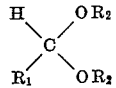

in which $R_1$ is selected from the group consisting of hydrogen and alkyl radicals and $R_2$ is an alkyl radical at a temperature between —50 and +150° C. in the presence of 0.1 to 10% based upon the total weight of the reactants of a mixed catalyst composed of monofluoro phosphoric acid and boron trifluoride, the maximum quantity of boron trifluoride therein being 40%.

7. A process for the production of beta alkoxy carboxylic acid esters from a ketene of the formula $$RCH=C=O$$

in which R is selected from the group consisting of hydrogen and alkyl groups and an aliphatic acetal of the formula

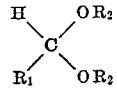

in which $R_1$ is selected from the group consisting of hydrogen and alkyl radicals and $R_2$ is an alkyl radical at a temperature between —50 and +150° C. in the presence of 0.1 to 10% based upon the total weight of the reactants of a mixed catalyst composed of difluoro phosphoric acid and boron trifluoride, the maximum quantity of boron trifluoride therein being 25%.

8. A process for the production of beta alkoxy carboxylic acid esters from a ketene of the formula $$RCH=C=O$$

in which R is selected from the group consisting of hydrogen and alkyl groups and an aliphatic acetal of the formula

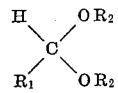

in which $R_1$ is selected from the group consisting of hydrogen and alkyl radicals and $R_2$ is an alkyl radical at a temperature between —50 and +150° C. in the presence of 0.1 to 10% based upon the total weight of the reactants of a mixed catalyst composed of dihydroxy fluoroboric acid and boron trifluoride, the maximum quantity of boron trifluoride therein being 25%.

9. The process of claim 1 comprising in addition neutralizing the reaction mixture with an alcoholic solution of an sodium alcoholate, the alcoholic component of which corresponds to that of the acetal employed as a starting material.

10. The process of claim 1 in which the reaction is carried out continuously and the concentration of the acetal in the reaction mixture is about 1–20% and said reaction is carried out at a temperature between 50 and 150° C.

11. The process of claim 1 in which said catalyst is dissolved in said acetal.

12. The process of claim 1 in which the pressure is within a range of from 40 mm. Hg to 5 atm.

References Cited in the file of this patent

UNITED STATES PATENTS

| | | |
|---|---|---|
| 2,192,015 | Nieuwland | Feb. 27, 1940 |
| 2,436,286 | Brooks | Feb. 17, 1948 |
| 2,475,564 | Hartough et al. | July 5, 1949 |
| 2,527,794 | Caesar et al. | Oct. 31, 1950 |
| 2,910,503 | Fox | Oct. 27, 1959 |

OTHER REFERENCES

Dorris et al.: J. Am. Chem. Soc. 60, 656–657 (1938).
Spiegler et al.: J. Am. Chem. Soc. 61, 1002–1004 (1939).
Hartough et al.: J. Am. Chem. Soc. 69, 3093–3096 (1947).
Kilpatrick et al.: J. Am. Chem. Soc. 76, 5865–5868 (1954).
Topchiev et al.: Chemical Abstracts 51, 13789 (1957).
Topchiev et al.: Chemical Abstracts 51, 14531 (1957).
Fuson: "Advanced Organic Chemistry," 1950, pp. 43, 56–58, 312–326, 333–340.
Booth et al.: "Boron Trifluoride and Its Derivatives," 1949, pp. 166–171.